United States Patent
Yin et al.

(10) Patent No.: US 8,554,926 B2
(45) Date of Patent: Oct. 8, 2013

(54) METHOD FOR ESTABLISHING DATA CONNECTION ON MOBILE NETWORK, MOBILE NETWORK, AND POLICY CONTROL ENTITY

(75) Inventors: Yu Yin, Shanghai (CN); Ying Hu, Shenzhen (CN); Shanshan Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1 day.

(21) Appl. No.: 13/270,029

(22) Filed: Oct. 10, 2011

(65) Prior Publication Data

US 2012/0036266 A1 Feb. 9, 2012

Related U.S. Application Data

(63) Continuation of application No. 12/833,732, filed on Jul. 9, 2010, which is a continuation of application No. PCT/CN2009/070059, filed on Jan. 7, 2009.

(30) Foreign Application Priority Data

Jan. 11, 2008 (CN) .......................... 2008 1 0003912

(51) Int. Cl.
*G06F 15/177* (2006.01)
(52) U.S. Cl.
USPC .......................................... 709/227; 709/228
(58) Field of Classification Search
USPC ................................ 709/227–229, 220–222
See application file for complete search history.

(56) References Cited

U.S. PATENT DOCUMENTS

| | | | |
|---|---|---|---|
| 8,077,681 B2 * | 12/2011 | Ahmavaara et al. | 370/338 |
| 2004/0066769 A1 * | 4/2004 | Ahmavaara et al. | 370/338 |
| 2008/0316972 A1 | 12/2008 | Shaheen | |

FOREIGN PATENT DOCUMENTS

| | | |
|---|---|---|
| CN | 1633202 A | 6/2005 |
| CN | 1665322 A | 9/2005 |
| CN | 1859300 A | 11/2006 |
| CN | 1859336 A | 11/2006 |
| CN | 1881959 A | 12/2006 |
| CN | 1934828 A | 3/2007 |
| CN | 101483928 B | 4/2011 |
| EP | 1 959 695 A1 | 8/2008 |
| ES | 2351792 T3 | 2/2011 |

(Continued)

OTHER PUBLICATIONS

Office Action issued in corresponding European Patent Application No. 09702148.9, mailed Feb. 6, 2012.

(Continued)

*Primary Examiner* — Kenneth R Coulter
(74) *Attorney, Agent, or Firm* — Brinks Hofer Gilson & Lione

(57) ABSTRACT

A method for establishing data connections on a mobile network, a mobile network, and a policy control entity are disclosed. The method includes: establishing a data channel between a user equipment (UE) and a gateway (GW), and allocating an Internet Protocol (IP) address to the UE according to an address allocation request or a data channel setup request sent from the UE; and triggering the policy control entity to establish or update a policy control session according to the IP address. By using the mobile network and the policy control entity under the present invention, after the data channel is established between the UE and the GW, the GW may trigger the policy control entity to establish or update a policy control session.

7 Claims, 8 Drawing Sheets

(56) References Cited

FOREIGN PATENT DOCUMENTS

| WO | 2004/074967 A2 | 9/2004 |
|---|---|---|
| WO | 2005/062545 A1 | 7/2005 |
| WO | 2007/039006 A1 | 4/2007 |
| WO | 2007/138407 A2 | 12/2007 |
| WO | 2009/089780 A1 | 7/2009 |

OTHER PUBLICATIONS

First Action Interview Pilot Program Pre-Interview Communication issued Mar. 12, 2012, in commonly owned U.S. Appl. No. 12/833,732.
GSM, "3$^{rd}$ Generation Partnership Project; Technical Specification Group Services and System Aspects; General Packet Radio Service (GPRS) Enhancements for Evolved Universal Terrestrial Radio Access Network (E-UTRAN) Access" (Release 8) 3GPP TS 23.401, V8.0.0. Dec. 2007.
Office Action issued in commonly owned U.S. Appl. No. 12/833,732, mailed Apr. 10, 2013.
Office Action issued in corresponding Chinese Patent Application No. 200810003912.9, mailed Dec. 11, 2009.
3$^{rd}$ Generation Partnership Project: Technical Specification Group Services and System Aspects; General Packet Radio Service (GPRS) enhancements for Evolved Universal Terrestrial Radio Access Network (E-UTRAN) access (Release 8), Global System for Mobile Communications. 3GPP TS 23.401, V8.0.0. Dec. 2007.
Written Opinion issued in corresponding PCT Application No. PCT/CN2009/070059, mailed Apr. 26, 2011.
Extended European Search Report issued in corresponding European Patent Application No. 09702149.9, mailed Apr. 26, 2011.
3GPP "3$^{rd}$ Generation Partnership Project; Technical Specification Group Services and System Aspects; General Packet Radio Service (GPRS) Enhancements for Evolved Universal Terrestrial Radio Access Network (U-TRAN) Access" (Release 8), 3 GPPT TS 23.401, V8.0.0, Dec. 2007.
3GPP "3$^{rd}$ Generation Partnership Project; Technical Specification Group Services and System Aspects; Architecture Enhancements for non-3GPP Access" (Release 8), 3 GPPT TS 23.402, V8.0.0, Dec. 2007.
3GPP "3$^{rd}$ Generation Partnership Project; Technical Specification Group Services and System Aspects; Policy Changing Architecture" (Release 8), 3 GPPT TS 23.203, V8.0.0, Dec. 2007.
3GPP "3$^{rd}$ Generation Partnership Project; Access to Trusted Non-3GPP IP Access Handover withPMIPv6 on S2a and Changed S8a/S2a"), 3 GPPT TS 23.402, V8.0.0, Dec. 2007.

* cited by examiner

METHOD FOR ESTABLISHING DATA CONNECTION ON MOBILE NETWORK, MOBILE NETWORK, AND POLICY CONTROL ENTITY

CROSS-REFERENCE TO RELATED APPLICATIONS

This application is a continuation of U.S. patent application Ser. No. 12/833,732, filed on Jul. 9, 2010, which is a continuation of International Application No. PCT/CN2009/070059, filed on Jan. 7, 2009. The International Application claims priority to Chinese Patent Application No. 200810003912.9, filed on Jan. 11, 2008. The afore-mentioned patent applications are hereby incorporated by reference in their entireties.

FIELD OF THE APPLICATION

The present application relates to a communications technology, and in particular, to a method for establishing data connections on a mobile network, a mobile network, and a policy control entity.

BACKGROUND OF THE APPLICATION

On an evolved packet system (EPS) network, user equipment (UE) accesses an evolved packet core (EPC) through a serving gateway (SGW) on a radio access network, and accesses an external packet data network (PDN) through a PDN GW. A policy control entity may dynamically generate a service data policy rule according to service information about the UE, and communicate the service data policy rule to the PDN GW and the SGW, thus implementing service-level dynamic policy control on the data.

In the prior art, the process of establishing a data connection to access a PDN by the UE includes: the SGW forwards a connection setup message sent from the UE to a PDN GW that corresponds to the PDN; the PDN GW returns a connection setup ACK to the SGW; the SGW returns a response indicating the completion of data connection setup to the UE.

The SGW may be a network element (NE) where a control plane and a user plane are separated or integrated. For example, the SGW may be a mobility management entity (MME) or a GW on the EPS network, or an integrated serving GPRS support node (SGSN) on a third generation (3G) network.

During the implementation of the present application, the inventor discovers the following problems in the prior art: When the UE accesses the core network for the first time, the UE may not request the allocation of an Internet Protocol (IP) address but requests only the setup of a data channel. If the network needs to implement policy control, the prior policy control procedures related to the EPS network data connection are not applicable to scenarios where no IP connection is established for the data channel between the UE and the PDN GW. This is because the prior policy control session is connected over IP. In addition, for the mobility management protocol between GWs, the prior art is applicable to only the GPRS Tunneling Protocol (GTP) not requiring an IP address and is inapplicable to the mobile IP protocol.

SUMMARY OF THE APPLICATION

Embodiments of the present application provide a method for establishing data connections on a mobile network, a mobile network, and a policy control entity. Thus, after a data channel is established between a UE and a GW, the GW triggers the policy control entity to establish or update a policy control session.

The technical solution of the present application is as follows:

According to first aspect of the embodiment of the present application, A method for establishing connections on a mobile network includes:

establishing, by a Packet Data Network Gate Way (PDN GW), a connection with a User Equipment (UE), wherein the UE does not obtain an Internet Protocol (IP) address in the connection establishment process;

receiving, by the PDN GW, an address allocation request sent by the UE;

allocating, by the PDN GW, the IP address to the UE according to the address allocation request sent by the UE; and communicating, by the PDN GW, the allocated IP address to a policy control entity so that the policy control entity establishes or updates a policy control session. According to second aspect of the embodiment of the present application, a method for establishing connections on a mobile network includes:

communicating, by a User Equipment (UE), a connection establishment request sent by the UE, wherein the connection establishment request indicates that the UE does not want to obtain an Internet Protocol (IP) address in the connection establishment process;

establishing, by the UE, a connection with a Packet Data Network Gate Way (PDN GW), wherein the UE does not obtain the IP address in the connection establishment process;

communicating, by the UE, an address allocation request to the PDN GW;

receiving, by the UE, an IP address sent by the PDN GW, wherein the IP address is allocated by the PDN GW according to the address allocation request.

According to third aspect of the embodiment of the present application, a Packet Data Network Gate Way (PDN GW) includes:

an establishing unit, adapted to establish a connection with a User Equipment (UE), wherein the UE does not obtain an Internet Protocol (IP) address in the connection establishment process;

a receiving unit, adapted to receive an address allocation request sent by the UE after the after the establishing unit has established the connection with the UE;

an allocating unit, adapted to allocate the IP address to the UE according to the address allocation request received by the receiving unit; and a sending unit, adapted to communicate the IP address allocated by the allocating unit to a policy control entity so that the policy control entity establishes or updates a policy control session.

According to fourth aspect of the embodiment of the present application, A User Equipment (UE) includes:

a sending unit, adapted to communicate a connection establishment request to a Packet Data Network Gate Way (PDN GW), wherein the connection establishment request indicates that the UE does not want to obtain an Internet Protocol (IP) address in the connection establishment process;

an establishing unit, adapted to establish a connection with the PDN GW, wherein the UE does not obtain an Internet Protocol (IP) address in the connection establishment process;

a sending unit, adapted to communicate an address allocation request to the PDN GW;

a receiving unit, adapted to receive an IP address sent by the PDN GW, wherein the IP address is allocated by the PDN GW according to the address allocation request.

By using the method for establishing data connections on a mobile network, the mobile network, and the policy control entity provided in embodiments of the present application, after a data channel is established between the UE and the GW, the GW triggers the policy control entity to establish or update the policy control session. When the UE obtains an IP address through the PDN GW, the PDN GW establishes or updates the policy control session; or when the UE obtains an IP address through the SGW, the SGW establishes a mobile IP connection with the PDN GW and then establishes or updates the policy control session. In embodiments of the present application, the policy control can still be implemented when the UE does not request the allocation of an IP address. Thus, embodiments of the present application are applicable to the GTP protocol and the mobile IP protocol.

DETAILED DESCRIPTION OF THE APPLICATION

Embodiments of the present application provide a method for establishing data connections on a mobile network, a mobile network, and a policy control entity. Thus, after a data channel is established between the UE and the GW, the GW triggers the policy control entity to establish or update the policy control session. For better understanding of the objective, technical solution and merits of the present application, the following describes the present application in detail with reference to the accompanying drawings and exemplary embodiments.

Figure 1:
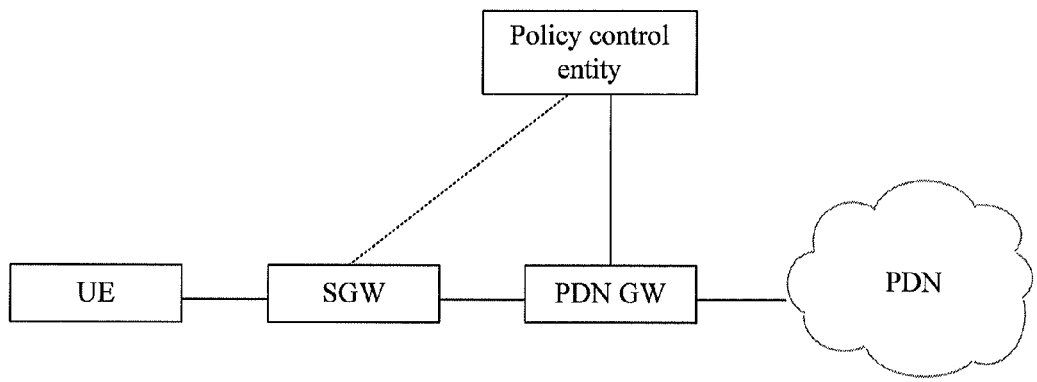
FIG. 1 shows network architecture that supports service-level dynamic policy control on a next generation mobile communication network.
Figure 2:
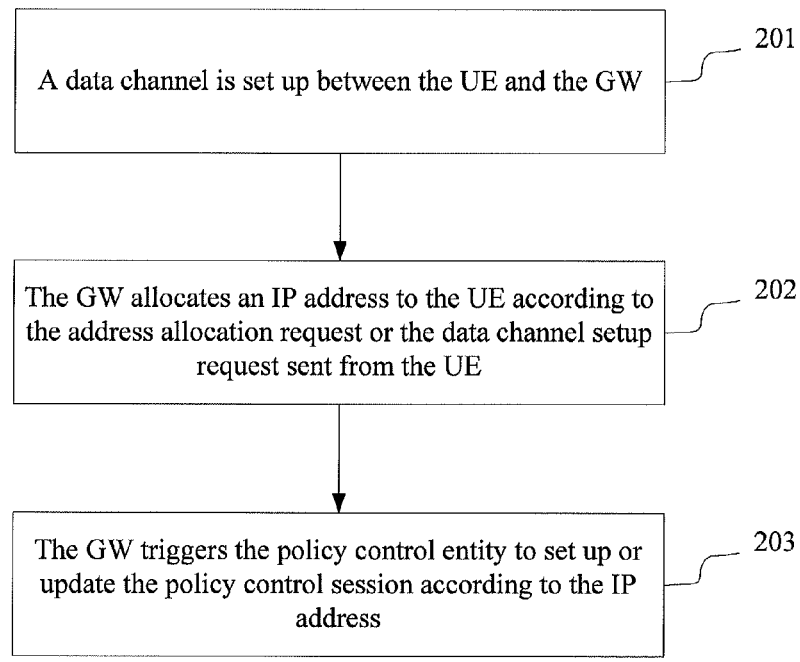
FIG. 2 is a flowchart of a method for establishing a data connection in an embodiment of the present application.

FIG. 1 shows network architecture that supports service-level dynamic policy control on a next generation mobile communication network. FIG. 2 is a flowchart of a method for establishing data connections in an embodiment of the present application. The method includes the following steps:

Step 201: A data channel is established between the UE and the GW.

Step 202: The GW allocates an IP address to the UE according to an address allocation request sent from the UE.

Step 203: The GW triggers the policy control entity to establish or update the policy control session according to the IP address.

In step 201, the process of establishing a data channel between the UE and the GW may include: establishing a data channel between the UE and the PDN GW; or establishing a data channel between the UE and the SGW. The UE sends an IP address allocation request, for example, a Dynamic Host Control Protocol (DHCP) message, to request the allocation of an IP address for accessing the PDN. The PDN GW sends an IP address allocation response that carries the allocated IP address.

In step 202, the process of triggering the policy control entity to establish or update the policy control session by the GW according to the IP address may include: establishing a policy control session between the PDN GW and the policy control entity; or establishing a policy control session between the SGW and the policy control entity; or establishing a policy control session between the PDN GW or the SGW and the policy control entity, and then updating the policy control rule by the policy control entity according to the allocated IP address.

Figure 3:
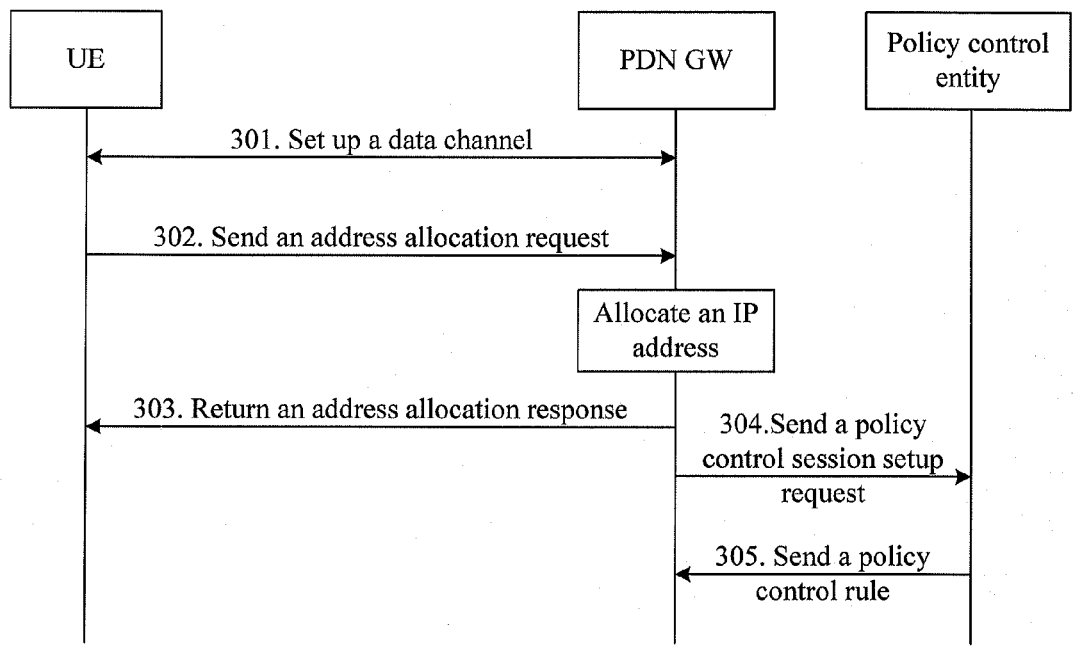
FIG. 3 is a schematic diagram illustrating a process of establishing a data connection in Embodiment 1 of the present application.

FIG. 3 is a schematic diagram illustrating a process of establishing a data connection in Embodiment 1 of the present application. The process includes the following steps:

Step 301: A UE establishes a data channel with a PDN GW, for example, an attach connection with the UE. The UE does not request the allocation of an IP address in the attach request. The network establishes a GTP bearer by using the GTP mobility management protocol. In the connection setup process, the UE obtains the connection related configuration information that may include a bearer control mode.

Step 302: The UE sends an address allocation request (for example, a DHCP request) to the PDN GW, requesting the allocation of an IP address for accessing the PDN. The PDN GW allocates the address according to the address allocation request, including allocating the IP address by the PDN GW itself or allocating the IP address to the UE through other servers or GWs.

Step 303: The PDN GW sends an address allocation response that carries the allocated IP address to the UE. In addition, the address allocation response may carry the PDN configuration information, including a domain name service (DNS) address, a proxy-call session control function (P-CSCF) address, and an application server address.

Step 304: The PDN GW sends a policy control session setup request to a policy control entity according to the IP address, requesting to establish a policy control session of this IP connection.

Step 305: The policy control entity establishes a policy control session according to the IP address carried in the policy control session setup request.

In step 305, the policy control entity may also communicate the policy control rule of the IP connection to the PDN GW.

Step 303 may be executed before or after step 304. Step 303 is optional.

Figure 4:
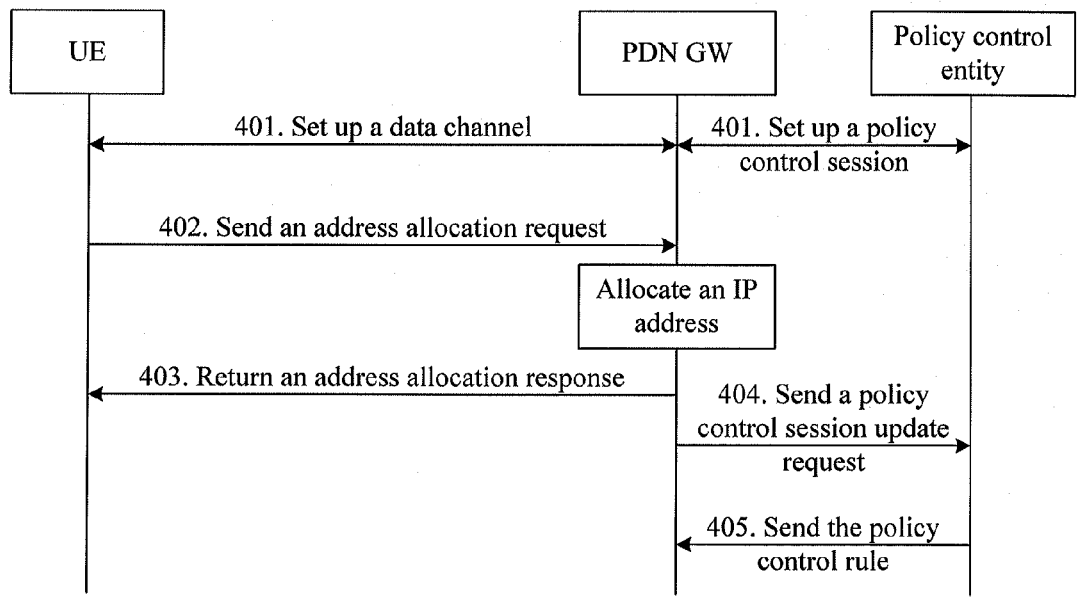
FIG. 4 is a schematic diagram illustrating a process of establishing a data connection in Embodiment 2 of the present application.

FIG. 4 is a schematic diagram illustrating a process of establishing a data connection in Embodiment 2 of the present application. The process includes the following steps:

Step 401: A UE establishes a data channel with a PDN GW. The PDN GW establishes a policy control session with a policy control entity. The PDN GW provides the policy control entity with a data channel ID. The data channel ID includes a UE ID and an ID that is used for accessing the PDN. The policy control entity may communicate related policy control rule information to the PDN GW. The policy control rule information may be used for establishing a data channel, for example, reserving bandwidth resources for the data channel. In the data connection setup process, the UE may also obtain the connection related configuration information from the PDN GW, for example, the bearer control mode.

Step 402: The UE sends an address allocation request, requesting the allocation of an IP address for accessing the PDN. After receiving the request, the PDN GW allocates an IP address to the UE, including allocating an IP address by the PDN GW itself or forwarding the request to other servers or GWs.

Step 403: The PDN GW sends an address allocation response that carries the allocated IP address. In addition, the address allocation response may carry the PDN configuration information, including a DNS server address, a P-CSCF address, and an application server address.

Step 404: The PDN GW sends a policy control session update request that carries the UE IP address and data channel ID to the policy control entity.

Step 405: The policy control entity may associate the data channel ID with a previously established policy control session to update the IP address of the policy control session. The policy control entity may also update the policy control rule, including provision of data packet filter and distribution information according to the IP address. Then, the policy control entity sends the updated policy control rule to the PDN GW.

Step 403 may be executed before or after step 404. Step 403 is optional.

In the preceding process, the UE accesses the same PDN. In step 401, no. IP address is allocated to the UE, but an IP address is allocated to the UE in step 402 and step 403.

Figure 5:
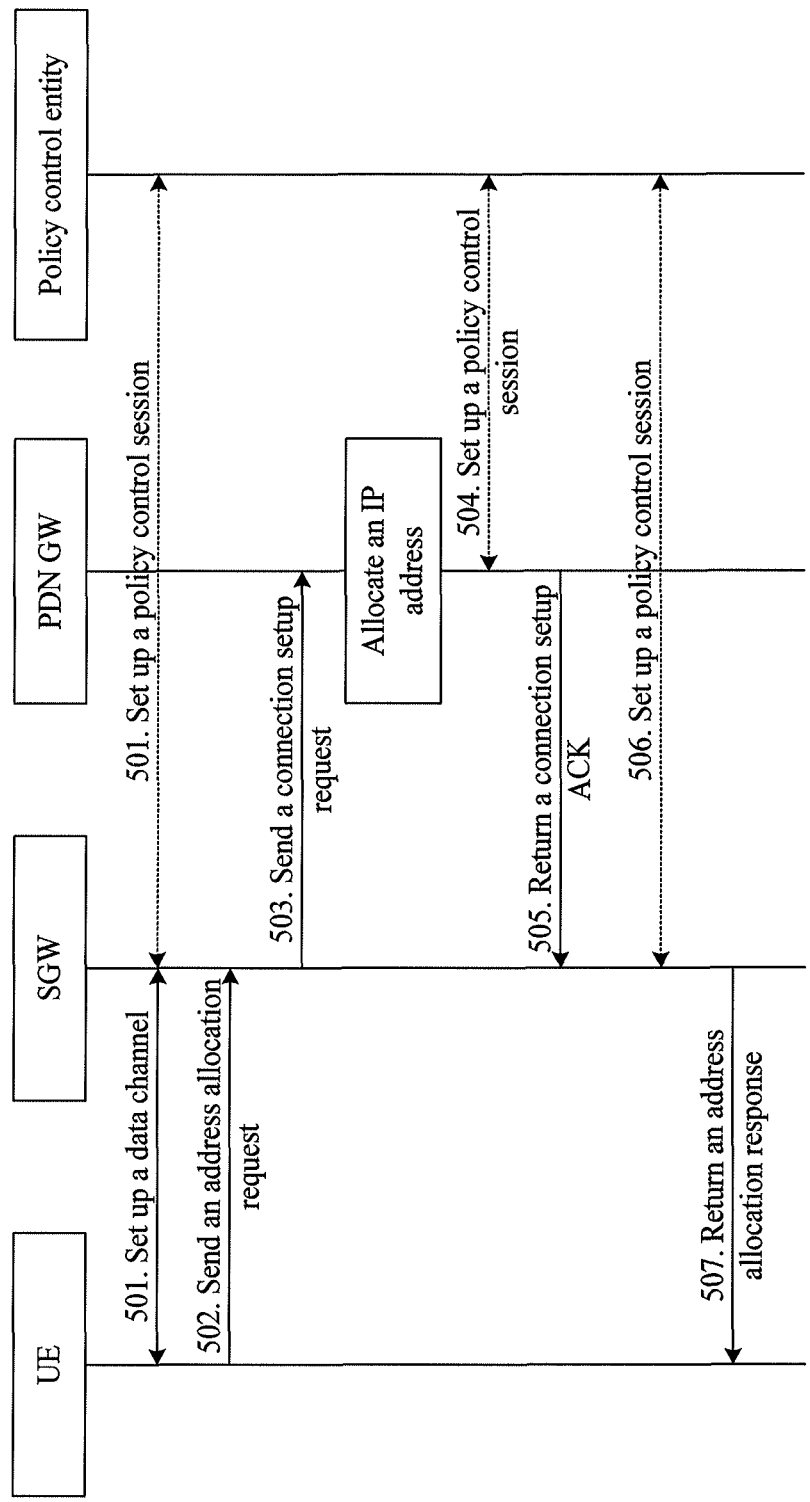
FIG. 5 is a schematic diagram illustrating a process of establishing a data connection in Embodiment 3 of the present application.

FIG. 5 is a schematic diagram illustrating a process of establishing a data connection in Embodiment 3 of the present application. The process includes the following steps:

Step 501: A UE establishes a data channel with an SGW. The SGW may also provide a policy control entity with a data channel ID, and establish a policy control session with the policy control entity to implement policy control on the data channel between the UE and the SGW. The data channel ID includes a UE ID and an ID that is used for accessing the PDN. In the data connection setup process, the UE may also obtain the connection related configuration information from the SGW, for example, the bearer control mode.

Step 502: The UE sends an address allocation request to the SGW, requesting the allocation of an IP address for accessing the PDN.

Step 503: The SGW sends a connection setup request, for example, a proxy mobile IP (PMIP) binding update request, requesting the PDN GW to establish an IP connection for the UE to access the PDN. The PDN GW allocates an IP address, including allocating an IP address by the PDN GW itself or through other servers and GWs.

Step 504: To establish a policy control session of the IP connection with the policy control entity, the PDN GW needs to obtain a related policy control rule.

Step 505: The PDN GW sends a connection setup ACK to the SGW, where the connection setup ACK includes an address allocation response that carries the allocated IP address. In addition, the connection setup ACK may carry the PDN configuration information sent to the UE, including a DNS server address, a P-CSCF address, and an application server address.

Step 506: If necessary, the SGW may initiate a process of updating or establishing the policy control session of the IP connection to the policy control entity, including providing the policy control entity with the connected IP address and the data channel ID.

Step 507: The SGW sends an address allocation response that carries the allocated IP address to the UE. In addition, the address allocation response may carry the PDN configuration information, including a DNS server address, a P-CSCF address, and an application server address.

Step 506 may be executed before or after step 507. Step 507 is optional. In addition, if the SGW already establishes a session with the policy control entity in step 501, the policy control entity may also initiate a request for updating the policy control rule to the SGW after receiving the IP address in step 504. If the SGW does not establish a session with the policy control entity in step 501, the PDN GW may establish a policy control session of the IP connection with the policy control entity after the PDN GW establishes an IP connection for the UE to access the PDN. For details, see the description in Embodiment 1 of the present application.

Figure 6:
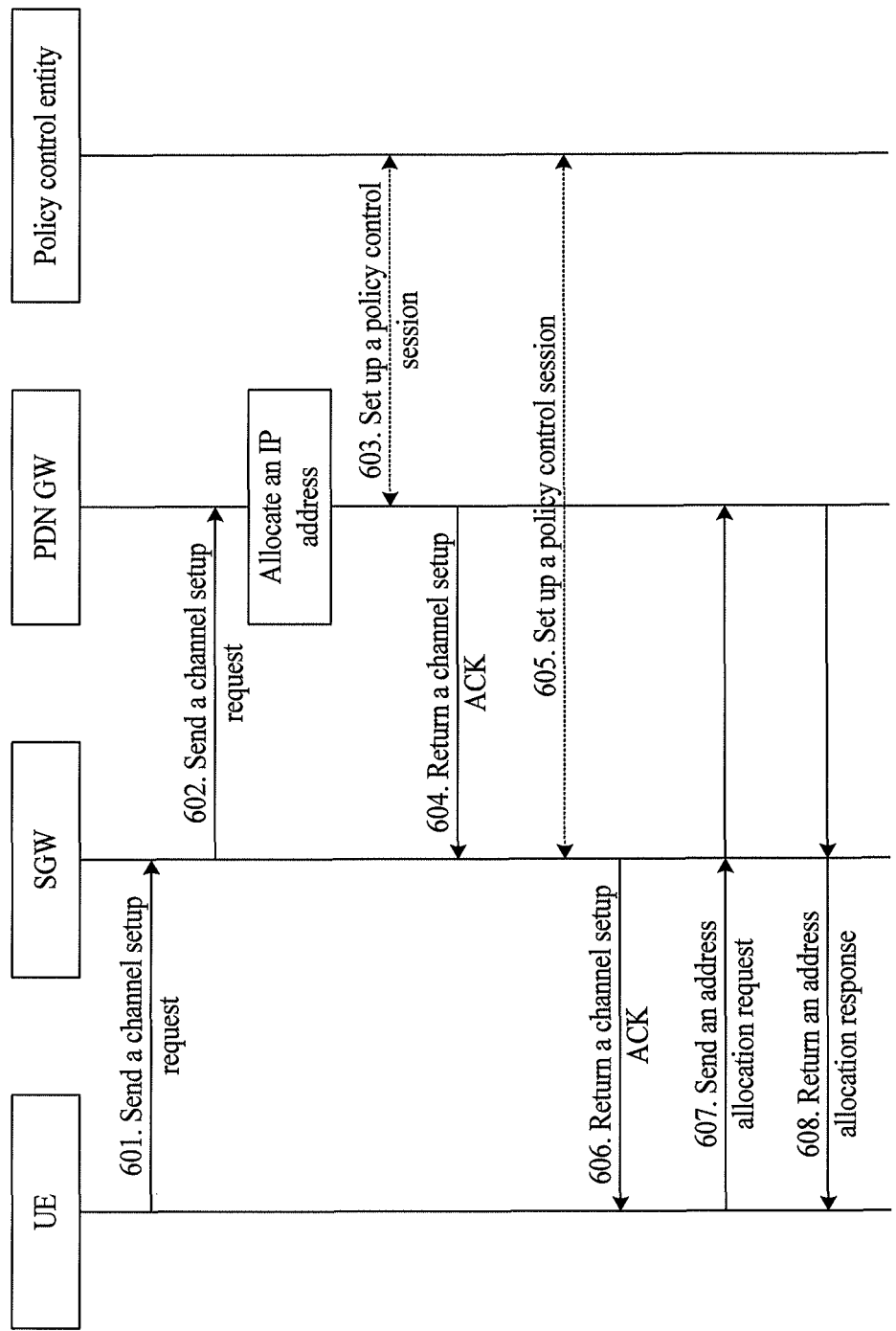
FIG. 6 is a schematic diagram illustrating a process of establishing a data connection in Embodiment 4 of the present application.

FIG. 6 is a schematic diagram illustrating a process of establishing a data connection in Embodiment 4 of the present application. The process includes the following steps:

Step 601: A UE sends a data channel setup request to an SGW, for example, an attach request, where the data channel setup request does not request the allocation of an IP address.

Step 602: The SGW sends a data channel setup request to the PDN GW, for example, a PMIP binding update request or a GTP create session request. The PDN GW establishes an IP connection for the UE to access the PDN according to the data channel setup request. The PDN GW allocates an IP address, including allocating an IP address by the PDN GW itself or through other servers and GWs.

Step 603: To establish a policy control session of the IP connection with a policy control entity, the PDN GW needs to obtain a related policy control rule.

Step 604: The PDN GW sends a data channel setup ACK to the SGW, where the data channel setup ACK includes an address allocation response that carries the allocated IP address. In addition, the data channel setup ACK may carry the PDN configuration information sent to the UE, including a DNS server address, a P-CSCF address, and an application server address.

Step 605: If necessary, the SGW may initiate a process of establishing a policy control session of the IP connection to the policy control entity, including providing the policy control entity with the connected IP address.

Step 606: The SGW sends a data channel setup ACK to the UE, for example, an attach complete message, where the data channel setup ACK does not carry the IP address allocated to the UE.

Step 607: The UE sends an address allocation request to the SGW or the PDN GW, requesting the allocation of an IP address.

Step 608: The SGW or the PDN GW sends an address allocation response that carries the allocated IP address to the UE. In addition, the address allocation response may carry the PDN configuration information, including a DNS server address, a P-CSCF address, and an application server address.

If step 603 is omitted in the preceding process, the PDN GW does not establish a policy control session with the policy control entity.

It is understandable to those skilled in the art that all or part of the steps in the methods according to the preceding embodiments may be performed by hardware instructed by a program. The program may be stored in a computer readable storage medium, such as a read-only memory/random access memory (ROM/RAM), a magnetic disk, and a compact disk.

Figure 7:
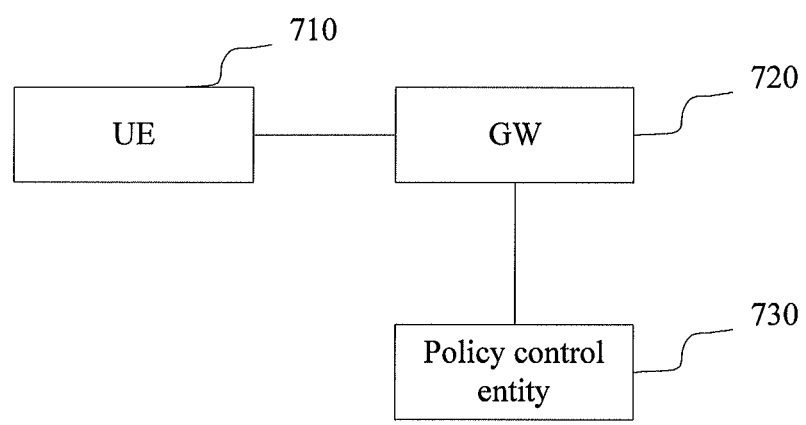
FIG. 7 shows architecture of a mobile network in an embodiment of the present application.

FIG. 7 shows architecture of a mobile network in an embodiment of the present application. The mobile network includes a UE 710, a GW 720, and a policy control entity 730.

The GW 720 is configured to: establish a data channel with the UE 710, and allocate an IP address to the UE according to the address allocation request or data channel setup request sent from the UE 710.

The policy control entity 730 is configured to establish or update a policy control session according to the IP address provided by the GW 720.

Specifically, the GW 720 includes a PDN GW and an SGW.

Figure 8:
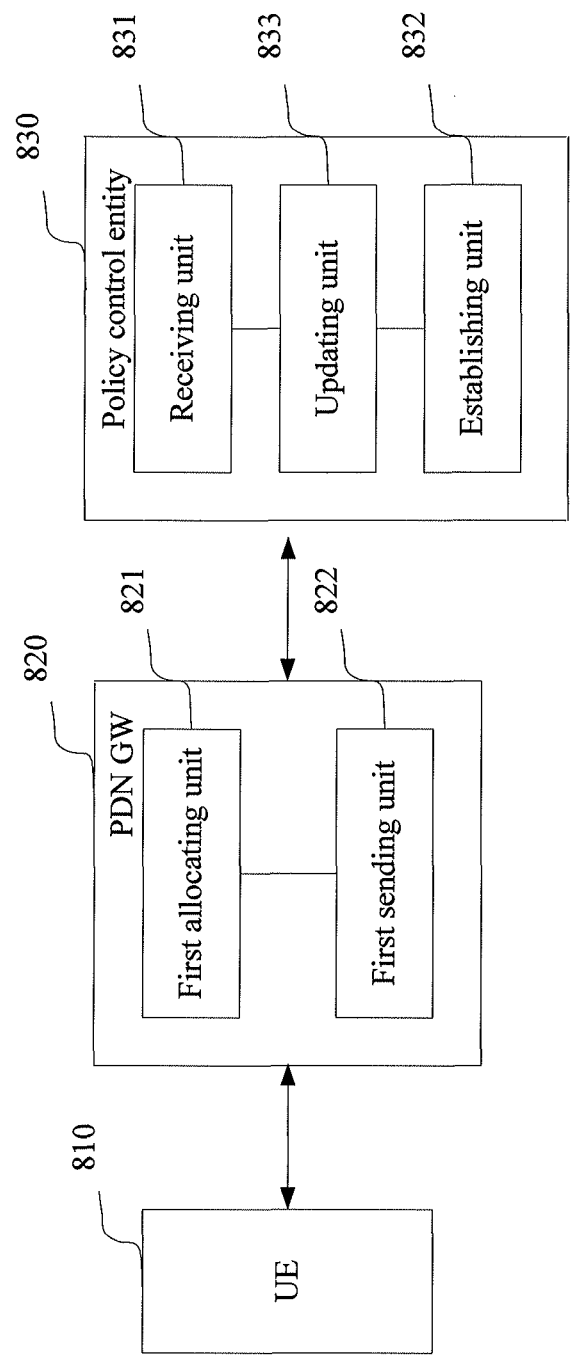
FIG. 8 shows a structure of a mobile network in Embodiment 4 of the present application.

FIG. 8 shows a structure of a mobile network in Embodiment 4 of the present application. The mobile network includes a UE 810, a PDN GW 820, a policy control entity 830, and an SGW.

The PDN GW 820 includes:

a first allocating unit 821, configured to allocate an IP address to the UE 810 according to the address allocation request or the data channel setup request sent from the UE 810, where the data channel setup request does not request the allocation of an IP address; and a first sending unit 822, configured to communicate a policy control session setup request that carries the IP address allocated to the UE 810 to the policy control entity 830 according to the IP address allocated by the first allocating unit 821.

The first sending unit 822 of the PDN GW is further configured to communicate a data channel setup ACK to the SGW. The data channel setup ACK includes an address allocation response that carries the allocated IP address to the SGW.

The SGW includes:

a sending unit, configured to communicate a policy control session setup request that carries the IP address to the policy control entity according to the IP address carried in the data channel setup ACK.

The policy control entity 830 includes:

a receiving unit 831, configured to receive a policy control session setup request from the PDN GW 820 and/or the SGW; and an establishing unit 832, configured to establish a policy control session according to the IP address that is allocated to the UE 810 and carried in the policy control session request.

The first sending unit 822 of the PDN GW is further configured to communicate an address allocation response that carries the allocated IP address to the UE 810.

The address allocation response may further carry the PDN configuration information, including a DNS server address, a P-CSCF address, and an application server address.

Figure 9:
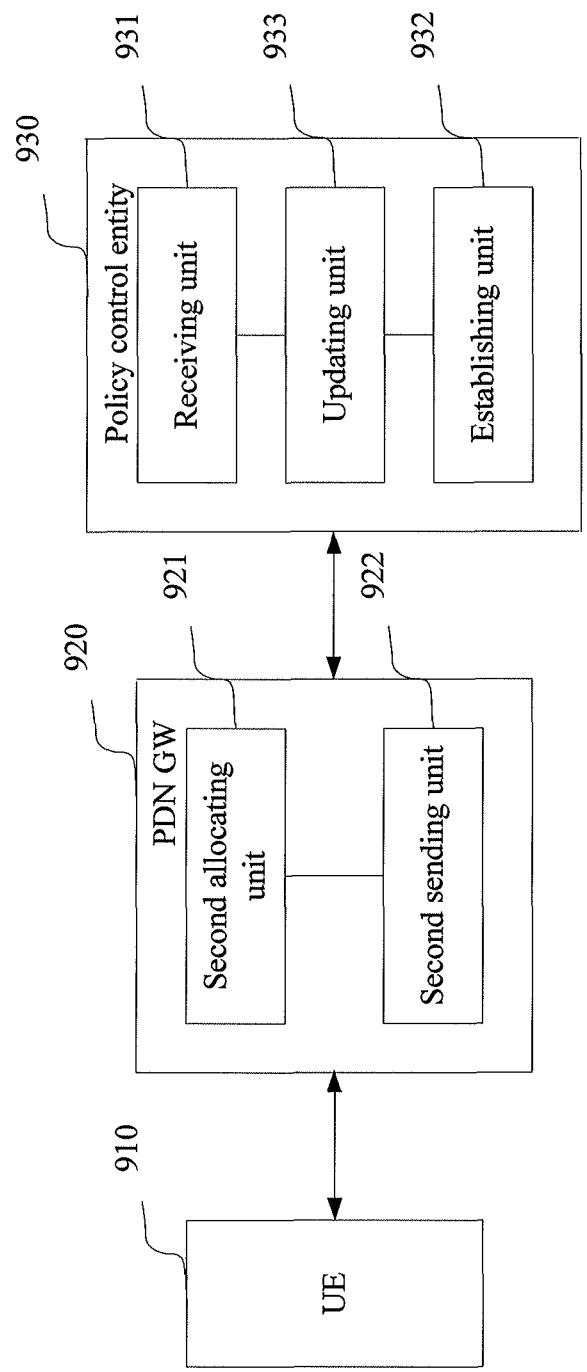
FIG. 9 shows a structure of a mobile network in Embodiment 5 of the present application.

FIG. 9 shows a structure of a mobile network in Embodiment 5 of the present application. The mobile network includes a UE 910, a PDN GW 920, and a policy control entity 930.

The PDN GW 920 includes:

a second sending unit 922, configured to communicate a policy control session setup request that carries a data channel ID to the policy control entity 930, where the data channel ID includes a UE ID and an ID that is used for accessing the PDN.

The policy control entity 930 includes:

a receiving unit 931, configured to receive a policy control session setup request from the PDN GW 920; and an establishing unit 932, configured to establish a policy control session according to the data channel ID carried in the policy control session request.

The PDN GW 920 may further include:

a second allocating unit 921, configured to allocate an IP address to the UE 910 according to the address allocation request sent from the UE 910.

The second sending unit 922 is further configured to communicate a policy control session update request that carries the IP address to the policy control entity 930 according to the IP address allocated by the second allocating unit 921.

The policy control entity 930 may further include an updating unit 933.

The receiving unit 931 is further configured to receive a policy control session update request that carries the IP address allocated to the UE 910 and the data channel ID sent from the PDN GW 920.

The updating unit 933 is configured to: associate the data channel ID with a previously established policy control session, and update the IP address and the policy control rule of the policy control session.

The policy control entity 930 may further include a sending unit configured to communicate the updated policy control rule to the PDN GW 920.

The second sending unit 922 is further configured to communicate an address allocation response that carries the allocated IP address to the UE 910.

The address allocation response may further carry the PDN configuration information, including a DNS server address, a P-CSCF address, and an application server address.

Figure 10:
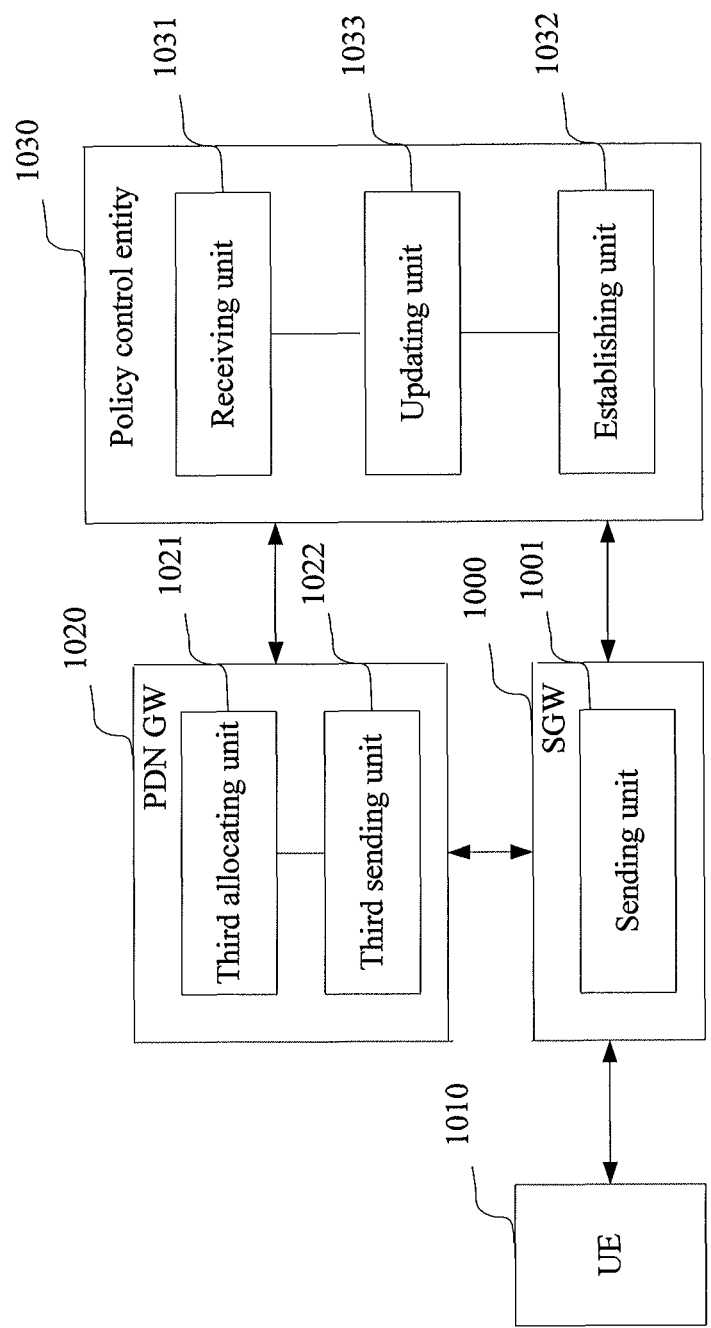
FIG. 10 shows a structure of a mobile network in Embodiment 6 of the present application.

FIG. 10 shows a structure of a mobile network in Embodiment 6 of the present application. The mobile network includes a UE 1010, an SGW 1000, a PDN GW 1020, and a policy control entity 1030.

The SGW 1000 includes a sending unit 1001 configured to communicate a policy control session setup request that carries a data channel ID to the policy control entity 1030.

The policy control entity 1030 includes: a receiving unit 1031, configured to receive a policy control session setup request from the SGW 1000; and an establishing unit 1032, configured to establish a policy control session according to the data channel ID carried in the policy control session request.

The sending unit 1001 of the SGW is further configured to communicate a connection setup request sent from the UE 910 to the PDN GW 1020.

The PDN GW 1020 includes: a third allocating unit 1021, configured to allocate an IP address to the UE 1010 according to the connection setup request; and a third sending unit 1022, configured to communicate a policy control session update request that carries the IP address to the policy control entity 1030.

The receiving unit 1031 of the policy control entity 1030 is further configured to receive a policy control session update request that carries the IP address allocated to the UE 1010 and the data channel ID from the PDN GW 1020. The policy control entity 1030 further includes: an updating unit 1033, configured to associate the data channel ID with a previously established policy control session, and update the IP address and the policy control rule of the policy control session; and a sending unit, configured to communicate the updated policy control rule to the PDN GW 1020 and the SGW 1000 according to the IP address carried in the policy control session update request.

The third sending unit 1022 of the PDN GW is further configured to communicate a connection setup ACK that includes an address allocation response carrying the allocated IP address to the SGW 1000. The sending unit 1001 of the SGW is configured to communicate the address allocation response that carries the IP address to the UE 1010.

The sending unit 1001 of the SGW is further configured to communicate a policy control session update request that carries the IP address and the data channel ID to the policy control entity 1030. The updating unit 1033 of the policy control entity is further configured to update the policy control rule corresponding to the data channel ID according to the IP address carried in the policy control session update request, and communicate the updated policy control rule to the SGW 1000 through the sending unit. The address allocation response may further carry the PDN configuration information, including a DNS server address, a P-CSCF address, and an application server address.

As shown in FIG. 8, a policy control entity provided in Embodiment 7 of the present application includes a receiving unit 831 and an establishing unit 832.

The receiving unit 831 is configured to receive a policy control session setup request that carries a data channel ID from the GW.

The establishing unit 832 is configured to establish a policy control session according to the data channel ID carried in the policy control session request.

As shown in FIG. 9, a policy control entity provided in Embodiment 8 of the present application includes a receiving unit 931, an establishing unit 932, and an updating unit 933.

The receiving unit 931 is configured to receive a policy control session setup request that carries a data channel ID sent from the GW, and receive a policy control session update request that carries an IP address allocated to the UE and a data channel ID sent from the GW.

The establishing unit 932 is configured to establish a policy control session according to the data channel ID carried in the policy control session request.

The updating unit 933 is configured to: associate the data channel ID with a previously established policy control session, and update the IP address of the policy control session and the policy control rule.

In addition, the policy control entity may include a sending unit configured to communicate an initial policy control rule and an updated policy control rule to the GW.

Thus, by using the method for establishing data connections, the mobile network, and the policy control entity provided in embodiments of the present application, after a data channel is established between the UE and the GW, the GW triggers the policy control entity to establish or update the policy control session. When the UE obtains an IP address through the PDN GW, the PDN GW establishes or updates the policy control session; or when the UE obtains an IP address through the SGW, the SGW establishes a mobile IP connection with the PDN GW and then establishes or updates the policy control session. In embodiments of the present application, the policy control can still be implemented when the UE does not request the allocation of an IP address. Thus, embodiments of the present application are applicable to the GTP protocol and the mobile IP protocol.

Detailed above are a method for establishing data connections, a mobile network, and a policy control entity under the present application. Although several exemplary embodiments are described, the claims are not limited to such embodiments. It is apparent that those skilled in the art can make various modifications and variations to the embodiments without departing from the scope of the claims. The claims shall cover the modifications and variations provided that they fall within the scope of protection defined by the claims or their equivalents.

What is claimed is:

1. A method for establishing connections on a mobile network, comprising:
    establishing, by a Packet Data Network Gate Way (PDN GW), a connection with a User Equipment (UE);
    receiving, by the PDN GW, an address allocation request from the UE, wherein the address allocation request is a Dynamic Host Control Protocol (DHCP) message;
    allocating, by the PDN GW, the IP address to the UE according to the address allocation request sent by the UE; and
    communicating, by the PDN GW, the allocated IP address to a policy control entity so that the policy control entity establishes a policy control session;
    wherein communicating of the allocated IP address to the policy control entity so that the policy control entity establishes a policy control session, comprises:
    communicating, by the PDN GW, a policy control session setup request carrying the allocated IP address to the policy control entity; and
    establishing, by the policy control entity, the policy control session according to the allocated IP address.

2. The method of claim 1, wherein before establishing a connection with the UE, the method further comprising:
    receiving a connection establishment request from the UE, wherein the connection establishment request indicates that the UE does not want to obtain an IP address during the connection establishment process.

3. The method of claim 1, wherein the method further comprises:
    communicating, by the PDN GW, the allocated IP address to the UE.

4. A Packet Data Network Gate Way (PDN GW), comprising:
    a first establishing unit adapted to establish a connection with a User Equipment (UE);
    a receiving unit adapted to receive an address allocation request from by the UE after the establishing unit has established the connection with the UE, wherein the address allocation request is a Dynamic Host Control Protocol (DHCP) message;
    an allocating unit adapted to allocate the IP address to the UE according to the address allocation request received by the receiving unit; and
    a sending unit adapted to communicate the IP address allocated by the allocating unit to a policy control entity so that the policy control entity establishes a policy control session by communicating, by the PDN GW, a policy control session setup request carrying the allocated IP address to the policy control entity; and establishing, by the policy control entity, the policy control session according to the allocated IP address.

5. The PDN GW of the claim 4, further comprising:
    a receiving unit adapted to receive a connection establishment request from the UE, wherein the connection establishment request indicates that the UE does not want to obtain the IP address in the connection establishment process;
    wherein the establishing unit is further adapted to establish the connection with the UE according to the connection establishment request received by the receiving unit.

6. The PDN GW of the claim 4, wherein the sending unit further adapted to communicate the allocated IP address to the UE.

7. A Packet Data Network Gate Way (PDN GW), comprising:
- a first establishing unit adapted to establish a connection with a User Equipment (UE);
- a receiving unit adapted to receive an address allocation request from by the UE after the establishing unit has established the connection with the UE, wherein the address allocation request is a Dynamic Host Control Protocol (DHCP) message;
- an allocating unit adapted to allocate the IP address to the UE according to the address allocation request received by the receiving unit;
- a first sending unit adapted to communicate the IP address allocated by the allocating unit to a policy control entity so that the policy control entity establishes or updates a policy control session;
- a second sending unit adapted to communicate a policy control session update request carrying the allocated IP address to the policy control entity, wherein the policy control entity updates the policy control session according to the allocated IP address; and
- a second establishing unit adapted to establish the policy control session between the PDN GW and the policy control entity, wherein the policy control entity is not informed of the IP address in the policy control session establishment process; wherein the second establishing unit is adapted to provide a data channel ID to the policy control entity so that the policy control entity establishes the policy control session according to the data channel ID, wherein the data channel ID comprises a UE ID and an ID that is used for accessing a Packet Data Network.

* * * * *